Figure 1:
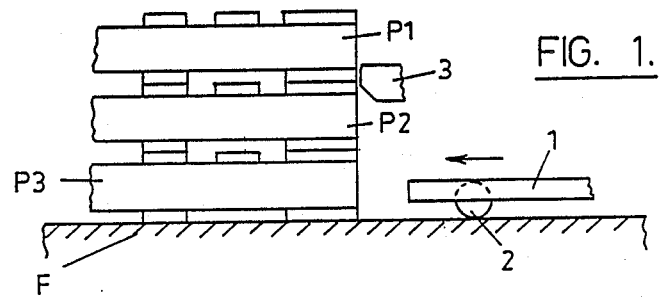

United States Patent [19]

Karpisek

[11] Patent Number: 4,960,362
[45] Date of Patent: Oct. 2, 1990

[54] PALLET DISPENSER

[76] Inventor: Ladislav S. Karpisek, 86 Woodfield Boulevarde, Caringbah, New South Wales, 2229, Australia

[21] Appl. No.: 400,161

[22] Filed: Aug. 29, 1989

[30] Foreign Application Priority Data

Aug. 31, 1988 [AU] Australia ................................ PJ0140

[51] Int. Cl.$^5$ ............................................. B65G 59/06
[52] U.S. Cl. .................................................. 414/797.4
[58] Field of Search ........................ 414/797.4, 797.5; 221/298

[56] References Cited

U.S. PATENT DOCUMENTS

| 3,043,476 | 7/1962 | Zwarycz | 414/797.5 X |
| 3,757,971 | 9/1973 | Frish | 414/797.5 |
| 4,701,092 | 10/1987 | Reynaud et al. | 414/797.4 X |

FOREIGN PATENT DOCUMENTS

| 3047914 | 7/1982 | France | 414/797.4 |
| 0095036 | 6/1983 | Japan | 414/797.5 |
| 0132233 | 6/1986 | Japan | 414/797.5 |
| 0247221 | 10/1988 | Japan | 414/797.4 |

Primary Examiner—Robert J. Spar
Assistant Examiner—William M. Hienz
Attorney, Agent, or Firm—Edwin D. Schindler

[57] ABSTRACT

A pallet dispenser to dispense pallets one at a time for the bottom front of a support frame for a stack of pallets. A vertically movable support outside the frame and an element biassing the support to an elevated work position where front and rear linearly movable pallet engaging fingers on the support are aligned with the outer edges of the top battens of the second lowest pallet in a pallet stack in the frame. Biassing structure operative upon raising the pallet stack relative to the support by an outside agency to engage the fingers under the top battens of the second lowest pallet in the stack and engage releasable lock structure to retain the support in an elevated work position. Manual linkage operative subsequent to the removal of the bottom pallet of the stack to release the lock structure and allow the support to lower under the weight of the pallet(s) supported by the fingers and when the support has achieved a lowered work position to withdraw the fingers from the engaged pallet thereby releasing the support to the action of its biassing structure which returns the support to its elevated work position.

5 Claims, 6 Drawing Sheets

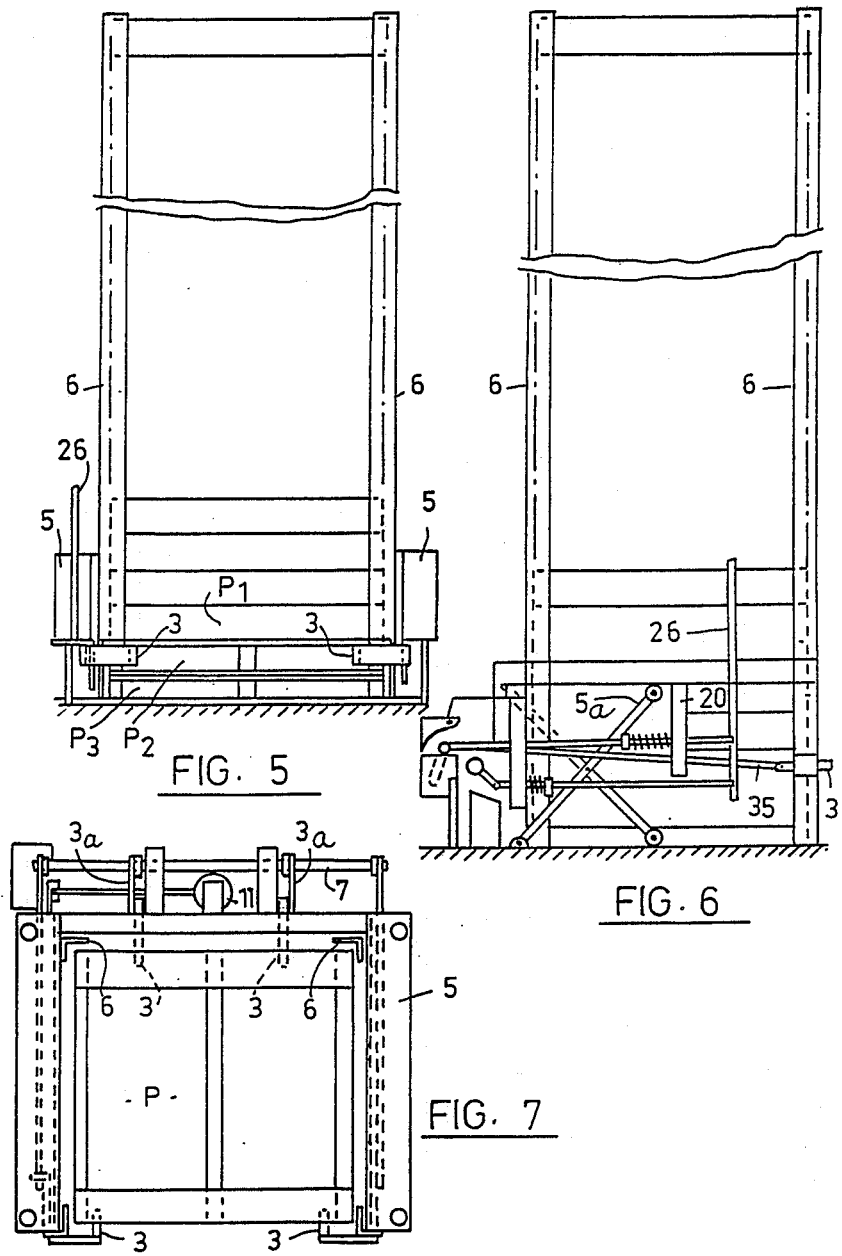

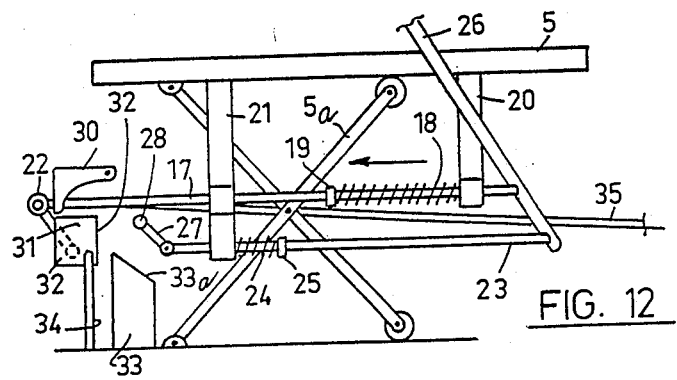
FIG. 12
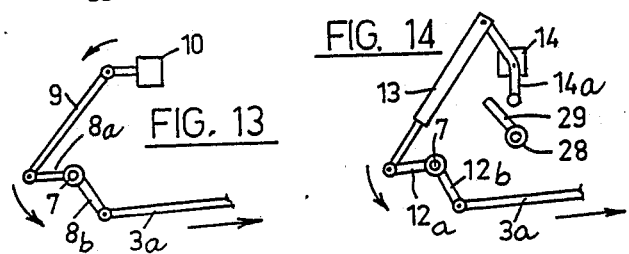
FIG. 13
FIG. 14
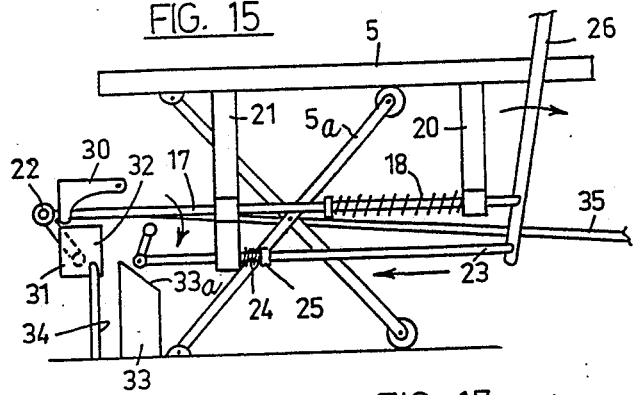
FIG. 15
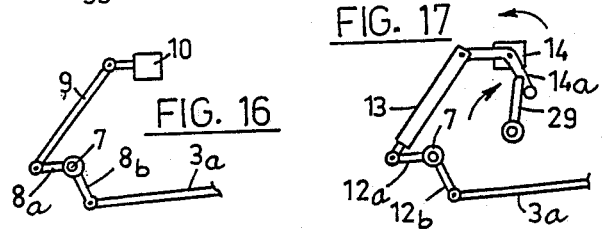
FIG. 16
FIG. 17

PALLET DISPENSER

This invention provides an apparatus to allow a lowermost pallet of a stack of pallets to be removed from the stack in a simple and effective manner. The apparatus is hereinafter called a pallet dispenser.

In industry it is common to have pallets arranged in stacks. The stacking is done by hand up to a manageable height and then a fork lift truck has to be used. The pallet recovery step is usually performed by engaging a fork lift truck to remove the topmost pallet or alternatively the topmost pallet is manhandled to the floor often falling and suffering damage. In the first recovery operation an expensive item of equipment (a fork lift truck) is used to recover a low cost item (a pallet) when the fork lift truck could be more cost effectively occupied elsewhere. In the second recovery operation there is the possibility of injury to workmen and shortened working life for the pallet.

For the above reasons the ability to remove pallets one at a time from the bottom of a stack of pallets using relatively inexpensive equipment is commercially very attractive. This invention allows the foregoing to be achieved.

The apparatus of the invention can be broadly said to comprise a holder for a number of rectangular pallets arranged in a stack one on top of another, a pallet removal opening in said holder at the foot of one side of the holder, a vertically movable support member external to the holder, a first pair of pallet support fingers and an oppositely positioned second pair of pallet support fingers, mounting means on said support member for said pairs of fingers to allow horizontal movement of said finger pairs away from each other and towards each other to the extent that said fingers can enter into the space between the upper and lower battens at opposite sides of a pallet in the holder, biasing means to urge said finger pairs towards each other, said support member having an elevated open rational position in which said fingers will be above the underface of the upper battens of a second lowest pallet of a pallet stack in the holder and a lowered operational position where said fingers will be below the underface of the upper battens of the lowermost pallet of a pallet stack in the holder, manually operable means to separate said finger pairs against the action of said biasing means and releasable lock means to retain said support member in its elevated operational position.

Figure 2:
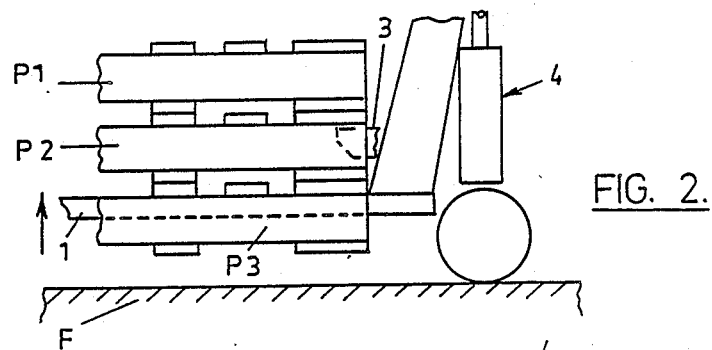
Figure 3:
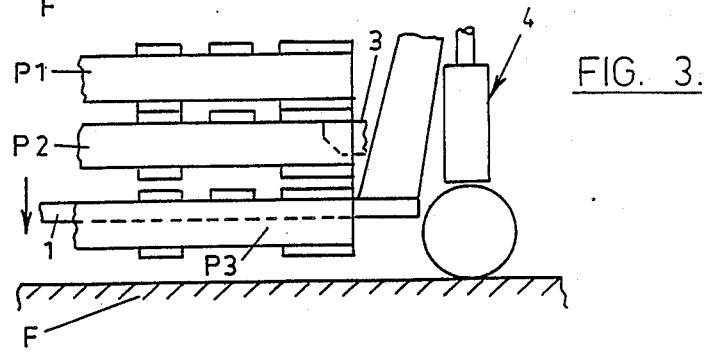
Figure 4:
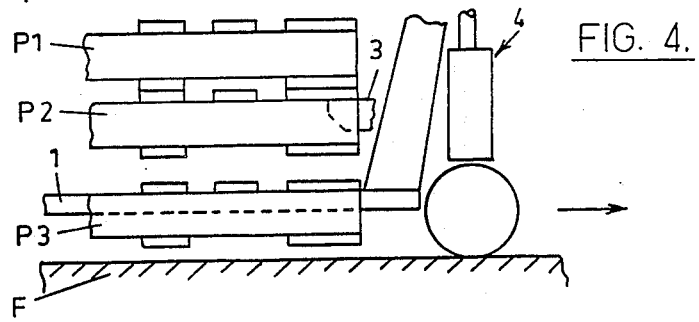
Figure 8:
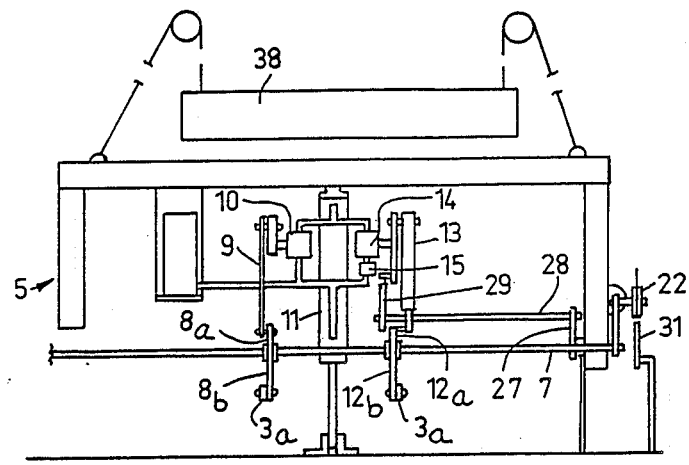
Figure 9:
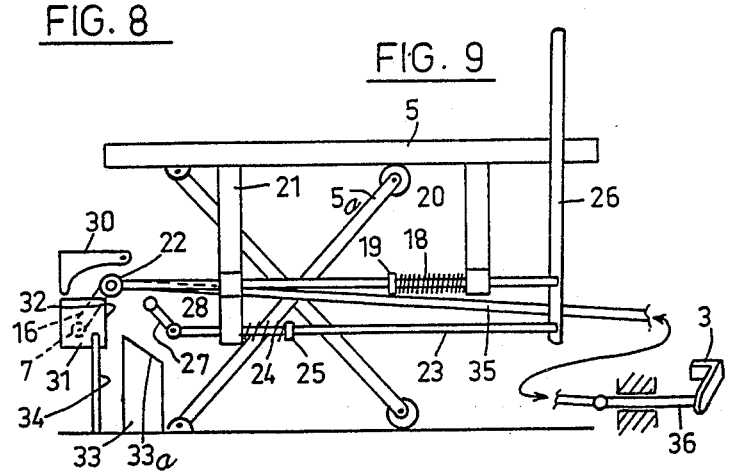
Figure 10:
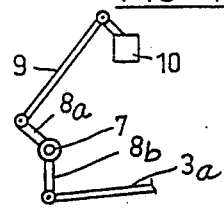
Figure 11:
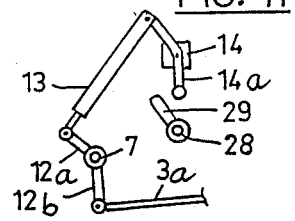
Figure 18:
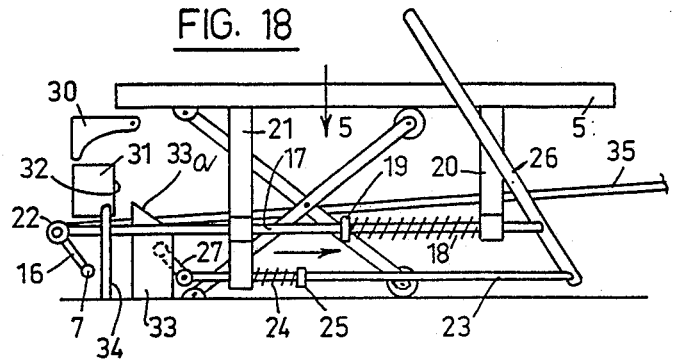
Figure 19:
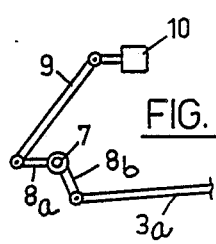
Figure 20:
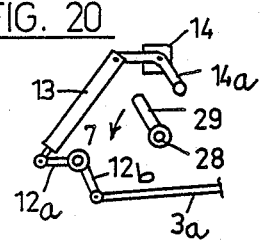
Figure 21:
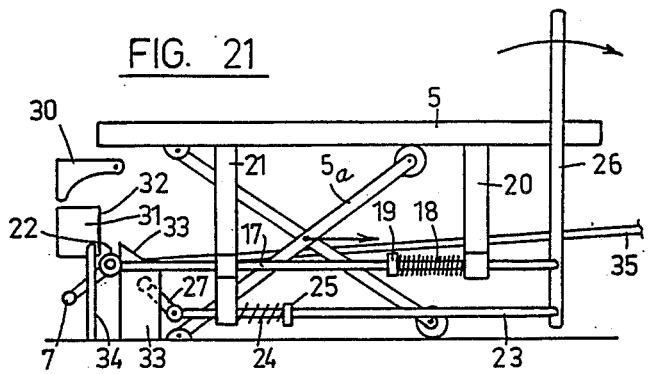
Figure 22:
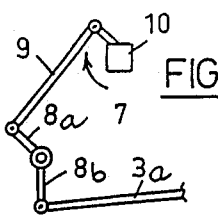
Figure 23:
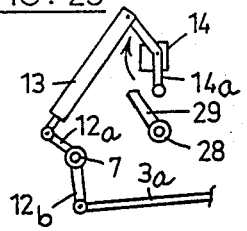
Figure 24:
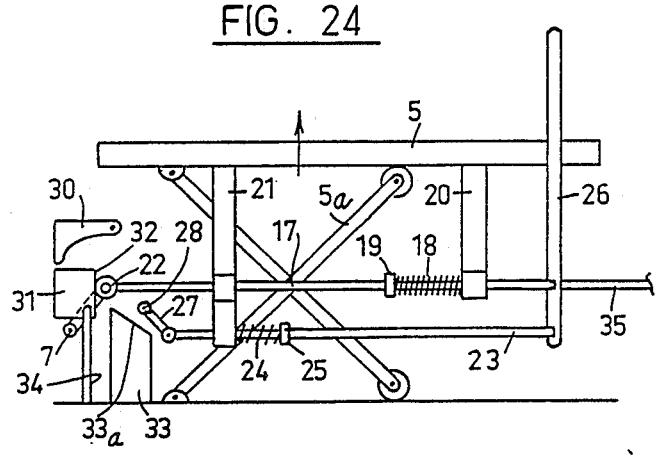
Figure 25:
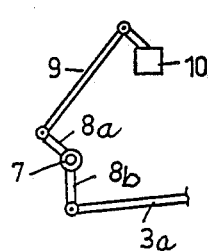
Figure 26:
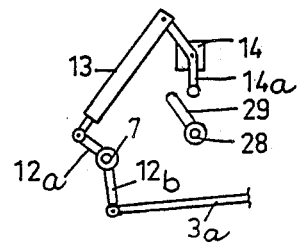

A presently preferred embodiment of the invention will no be described with reference to the accompanying drawings in which:

FIG. 1 is schematic view of a first step in the process of removing a pallet from a stack of pallets with apparatus according to the invention, FIG. 2 is the second step in the pallet removal process, FIG. 3 is the third step in the pallet removal process, FIG. 4 is the fourth step in the pallet removal process, FIG. 5 is a front elevation of the preferred form of the machine of the invention, FIG. 6 is a side view of the machine of FIG. 5, FIG. 7 is a top view of the machine of FIG. 5, FIG. 8 is a schematic rear view of the machine of FIG. 5 showing some of the operational parts of the machine, FIG. 9 is an enlarged side view of operational parts of the machine of FIG. 5 when in the standby position prior to the commencement of a pallet removal operation, FIG. 10 is a fragmentary view of first hydraulic control means for the condition shown in FIG. 9, FIG. 11 is a view similar to FIG. 10 of second hydraulic control means, FIG. 12 is a view similar to FIG. 9 showing the change in the position of the operational parts at the commencement of the pallet dispensing operation, FIG. 13 shows the first hydraulic control means configuration for the FIG. 12 operation, FIG. 14 shows the second hydraulic control means configuration for the FIG. 12 operation, FIG. 15 shows the positional of the operational parts of the machine at the next stage of the pallet dispensing operation, FIG. 16 shows the first hydraulic control means configuration for the FIG. 15 operation, FIG. 17 shows the second hydraulic control means configuration for the FIG. 15 operation, FIG. 18 shows the position of the operational parts of the machine at the next (pallet stack lowering) state of the pallet dispensing operation, FIG. 19 shows the first hydraulic control means configuration for the FIG. 18 operation, FIG. 20 shows the second hydraulic control means configuration for the FIG. 18 operation, FIG. 21 shows the position of the operational parts of the machine at the next (stack lowered) stage of the pallet dispensing operation, FIG. 22 shows the first hydraulic control means configuration for the FIG. 21 operation, FIG. 23 shows the second hydraulic control means configuration for the FIG. 21 operation, FIG. 24 shows the position of the operational parts of the machine at the next (pallet finger elevation) stage of the pallet dispensing operation, FIG. 25 shows the first hydraulic control means configuration for the FIG. 24 operation, and FIG. 26 shows the second hydraulic control means configuration for the FIG. 24 operation.

FIGS. 1 to 4 diagramatically show the four steps in pallet dispensing using the preferred form of the present invention. In FIG. 1 there is a stack of pallets P1,P2,P3 resting on a floor F. There is shown a pallet hand truck tyne pair indicated 1 and the numeral 2 indicates the tyne wheels. The numeral 8 indicates one of several fingers movable in the direction of the arrow supported by a frame vertically movable in a limited range and able to be locked in at least an elevated position.

In FIG. 2 the operating mechanism of the hand truck is indicated 4 and it has been operated after insertion of the tynes 1 into the pallet P3 to raise the pallet stack an amount sufficient to allow the fingers 3 to enter into the pallet P3 and be spaced a small distance below the underface of the top battens of the pallet P2. The support for the fingers 3 is then locked against vertical movement.

In FIG. 3 the pallet tynes are lowered and the pallet P2 comes to rest on the fingers 3 and the pallet P3 is lowered to clear the pallet P2.

In FIG. 4 the pallet P3 is removed from the stack on the hand truck. The finger support is released and it moves down with the pallet stack in a controlled manner until the lowermost pallet rests on the floor F and the finger support is then raised to locate the fingers at the elevation shown in FIG. 1 ready for the process to be repeated next time a pallet is required.

The illustrated embodiment of the invention provides a "U" shaped frame 5 which supports the fingers 3 in a manner to be described and is vertically movable for a limited distance up and down relative to four vertical angle members 6 interconnected in a suitable manner to provide a holder for a stack of pallets, two of which are shown in FIG. 5 and 6. Movement of the frame 5 up and down is through scissor links 5a at opposite sides of the holder linking the holder to the frame 5.

There is an arrangement of levers, arms and hydraulics to allow the pallet dispenser to operate a described with reference to FIGS. 1 to 4. These will now be described by way of schematic drawings.

Referring to FIGS. 8, 9, 10 & 11 at the rear of the frame 5 and mounted thereon there is mounted a first lateral part rotatable shaft 7 provided with attached lever arms 8a and 8b. The arm 8a is operatively coupled through a link 9 to a first hydraulic valve lo for controlling the flow of oil to and from a hydraulic piston in cylinder combination 11. The unit 11 is coupled at its ends respectively to the movable frame 5 and the base of the pallet holder formed by the uprights 6. The purpose of the unit 11 will be explained later. The arm 8b is connected through a link 3a to one of the rear fingers 3. It is to be noted that there is a front finger pair at the front of the pallet holder and a rear finger pair at the rear of the pallet holder with all of the fingers horizontally movable and in a common plane. The finger pairs move towards each other and away from each other as will be later described.

Additional arms 12a, 12b are fixed to the shaft 7. The arm 12a is connected through a link 13 including a lost motion linkage to a hydraulic valve 14 which is in circuit with the unit 11 through a flow restrictor 15. The arm 12b is connected through another link 3a to the other finger 3 of the rear finger pair.

Referring now to FIG. 9, there is an arm 16 fixed at one end to the shaft 7 and pivotally connected at the other end to a rod 17 which is slidably supported in support members 20 and 21 fixed to the frame 5. The rod 17 is biassed in a first direction by a spring 18 around the rod 17 and located between a collar 19 on the rod 17 and the support 20 There is a cam roller 22 at the junction of the rod 17 and the arm 16.

Another rod 23 is slidably mounted in the support 21. The rod 23 is biassed in the opposite direction to the rod 17 by a spring 24 located between a collar 25 on the rod 23 and the support 21. Corresponding ends of the rods 17 and 28 are pivotally connected to an operating handle 26. A link 27 is pivotally connected to the other end of the rod 23 and the link 27 is fixed to another shaft 28 part rotatably mounted laterally at the rear of the frame 5. The shaft 28 has an arm 29 fixed to it (see FIG. 11) and when the shaft 28 is part rotated in the operation of the machine the arm 29 will operate the valve 14.

Referring again to FIG. 9, there is a cam arrangement fixed to the pallet holder base. The cam arrangement comprises a liftable latch arm 30, an abutment member 31 with abutment faces 32 and 34. There is another abutment member 33 with a cam face 33a. FIG. 9 also illustrates a rod 35 connected at one end to the arm 16 and at the other end to a shaft 36 slidably mounted in a bearing 37 on the frame 5. One of the front fingers 3 is connected to the shaft 36. There is a matching arrangement at the other side of the frame 5 comprising another arm 16 fixed to the shaft 7 and another rod 35 with shaft 36 in a bearing 37 with the other finger 3 of the front finger pair fixed to the shaft 36. It follows that as the shaft 7 rotates the front finger pair will be moved at the same time in the bearings 7 and the rear finger pair will be moved by the arms 8a and 12a and the links 3a.

The mechanism of control is in the position shown in FIG. 9 when the frame 5 is in the elevated operational position. It is to be noted that there is a counterweight, indicated 38 in FIG. 8 which is connected to the frame 5 and supported by cables running over pulleys supported from the uprights 6. The purpose of the counterweight will be explained later but when the frame 5 is in the elevated position the counterweight is in a lowered position.

With the frame 5 elevated the valve 10 is open and the valve 14 is closed. The operative ends of the fingers 3 (under the influence of the spring 18 tending to turn the shaft 7 anti-clockwise in FIG. 9) press hard against the outer edges of the front and rear battens of the second lowest pallet, see FIG. 1. A pallet truck is then inserted into the lowermost pallet P3 and it is raised by the hand truck and this causes the extension of the unit 11, which is possible because of the open valve 10, until the fingers 3 slide off the edges of the battens and pass under the front and rear battens of the pallet P2 under the influence of the spring 18. The hand truck is elevated sufficiently to ensure that all fingers 3 have passed below the pallet battens.

Several things happen simultaneously with the insertion of the fingers 3 into the pallet P2. The shaft 17 moves to the left as indicated by the direction of the arrow in FIG. 12 to move the operating handle 26 to the angled position shown. There is a part rotation of the shaft 7 to cause the valve 10 to close (see FIG. 13) to hydraulically lock the unit 11 and hold the frame 5 looked in the elevated position. There is an extension of the link 13 from the condition shown in FIG. 11 but the valve 14 remains closed because the lost motion in the link 18 will not transfer the rotation of the shaft 7 to the valve 14. At the same time the roller 22 passes below the latch member 30 momentarily lifting it as the roller 22 passes below it.

With the frame 6 locked in the elevated position the pallet P3 can be removed. There is sufficient clearance between the pallet P3 and floor when the fingers 3 enter the pallet P2 to allow the hand truck to be lowered to rest the pallet P2 on the fingers 3, and then lowered further to separate the pallets P3 and P2 and still have sufficient clearance between the pallet P3 and the ground to allow the pallet P3 to be removed on the hand truck. The weight of the pallet P2 and the other pallets in the pallet stack are now supported on the fingers 3.

After the removal of the pallet P3 the machine is readied for the next pallet removal. In FIG. 15 the shaft 23 is moved in the direction of the arrow by movement of the handle 26 in the direction of the arrow. This is possible because the shaft 17 cannot return to the FIG. 9 condition because the roller 22 is bearing on the end of the latch member 30. Movement of the shaft 23 compresses the spring 24.

As is clear from FIG. 16 the movement of the shaft 23 will not effect shaft 7 and the valve 10 which will remain closed. The shaft 28 will be part rotated by movement of the shaft 23 and the attached arm 27 will move and cause the arm 29 to engage the arm 14a and open the valve 14 to allow the weight of the frame 5 plus the weight of the pallets in the stack to move the frame 5 downwardly by expelling liquid from above the piston in the unit 11. The rate of descent is regulated by the flow restrictor 15. The down movement of the frame 5 will cause the counterweight 38 to be elevated.

As the frame 5 descends the cam face 33a on member 33 and the spring 24 co-operate with a cam roller at the connection of the rod 23 and the arm 27 to rotate the arm 27 and the shaft 28. This will not effect the operation of the valve 14 because the arm 29 is not directly coupled to the valve operating lever 14a, see FIG. 14. The rod 23 will be moved to the position of FIG. 18 causing the handle 26 to be angled as shown in FIG. 18. When the frame 5 has fully descended, to place the pallet P2 on the ground, the roller 22 will be free of the abutment member 31 as shown in FIG. 18.

By returning the handle 26 to the FIG. 9 (see FIG. 21) the roller 22 will be moved below the member 81 and into the track adjacent abutment face 34 and the shaft 7 will be rotated opening the valve 10. The rotation of the shaft 7 will also move the member 13 (now "solid" as the lost motion was absorbed by the contraction of the member 13 when the valve 14 was opened) to cause the valve 14 to close. At the same time the rotation of the shaft 7 will cause the fingers 3 to withdraw from below the battens of the pallet P2 thus freeing the frame 5 for elevation by the counterweight 38 to the position where the fingers 3 are aligned with the edges of the battens of the second lowest pallet (now P1) in the pallet stack.

Due to the engagement of the roller 22 with the faces 32 and 34 the fingers 3 are held spaced from the front and rear alignments of the battens of the pallets in the stack during the elevation of the frame 5. However, as soon as the roller 22 clears the top of the face 32 the spring 18 can expand to press the fingers 3 into contact with the edges of the battens of the pallet P1 with which the fingers 3 are now aligned.

The pallet dispenser is now ready for a repeat of the foregoing operational sequence and is in the configuration as Illustrated in FIGS. 9, 10 and 11.

I claim:

1. A pallet dispenser including a holder for a number of rectangular pallets arranged in a stack one on top of another, a pallet removal opening in said holder at the foot of one side of the holder, a vertically movable support member external to the holder, a first pair of pallet support fingers and an oppositely positioned second pair of pallet support fingers, mounting means on said support member for said pairs of fingers to allow horizontal movement of said finger pairs away from each other and towards each other to an inner working position where said fingers will lie in a space between upper and lower battens at opposite sides of a pallet in the holder, first biassing means to urge said finger pairs towards each other, said support member having an elevated operational position in which said first biasing means urges said fingers against said upper battens of a second lowest pallet of a pallet stack in the holder so that, upon raising of the pallet stack, the fingers move into said space, said support member also having a lowered operational position where said fingers will be below the underface of the upper battens of the lowermost pallet of a pallet stack in the holder, second biassing means biassing the support member to its elevated operational position, releasable lock means to retain said support member in its elevated operational position, manually operated linkage means to engage and release said lock means and separate said finger pairs against the action of said first biassing means.

2. A pallet dispenser as claimed in claim i wherein the lock means comprises a piston in cylinder combination connecting said support member to said holder with a connection including valve means between cylinder zones either side of the piston whereby hydraulic fluid is transferred from one cylinder zone to the other as the support member moves up and down.

3. A pallet dispenser as claimed in claim 2 wherein said first biassing means and said manually operated linkage means are linked together and said valve means includes a first flow shut-off valve in a line between the cylinder zones and a second flow shut-off valve and a flow rate regulating means in a line between the cylinder zones, the arrangement being that when the support member is in the elevated operational position with the finger pairs not in the inner working position the first valve is open and the second valve is closed, and when the support member is in the elevated operational position and the finger pairs are in the inner working position both valves are closed, and when the manually operated linkage means is operated in a first manner the second valve is opened and the support member can descend to the lowered operational position under the application of an external load applied to the support member sufficient to exceed the bias acting on the support member with automatic movement of the manually operated linkage means in a manner opposite to said first manner, and when the manually operated linkage means is operated in the first manner again with the support member in the lowered operational position the second valve is closed and the first valve is opened and the bias acting on the fingers is overcome to move and maintain the fingers away from their inner working position and the bias acting on the support member raises it to its elevated operational position where said fingers are released to move under the bias acting thereon.

4. A pallet dispenser as claimed in claim 1 wherein the support member is connected to the holder through scissors arm connections allowing the vertical movement of the support member relative to the holder.

5. A pallet dispenser to dispense pallets one at a time for a stack of pallets, said pallet dispenser comprising a frame to support a stack of pallets, a pallet discharge opening at the bottom of a front face of the frame, a vertically movable support outside the frame, first biassing means to bias the support to an elevated work position where front and rear linearly movable pallet engaging fingers on the support are urged inwardly against the outer edges of top battens of the second lowest pallet in a pallet stack in the frame by spaced biassing means, operative upon raising the pallet stack relative to the support by means of an outside agency to engage the fingers under the top battens of the second lowest pallet in the stack and engage releasable lock means to retain the support in an elevated work position, manual means with associated linkage operative subsequent to the removal of the bottom pallet of the stack to release said lock means and allow the support to lower under the weight of the pallet(s) supported by the fingers and when the support has achieved a lowered work position to withdraw said fingers from the engaged pallet thereby releasing said support to the action of said first biassing means which returns the support to its elevated work position.

* * * * *